Figure 1:
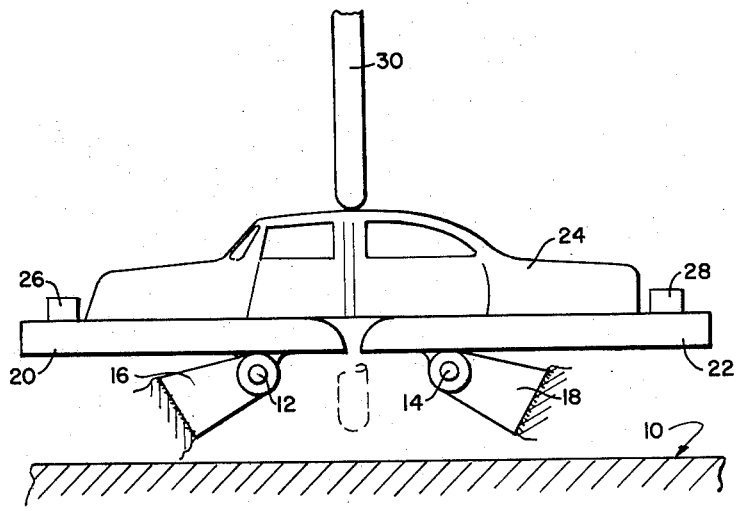

Aug. 20, 1963   R. H. SCHLIDT ETAL   3,101,044
METHOD OF CONVERTING AUTOMOBLIE BODIES TO A COMPACT
FORM FOR TRANSPORT AS SCRAP
Filed May 18, 1961

INVENTORS
RUDOLPH H. SCHLIDT
FRITZ K. PAULI

BY *Cushman, Darby & Cushman*

ATTORNEYS

United States Patent Office 3,101,044
Patented Aug. 20, 1963

3,101,044
METHOD OF CONVERTING AUTOMOBILE BODIES TO A COMPACT FORM FOR TRANSPORT AS SCRAP
Rudolf H. Schlidt and Fritz K. Pauli, both of 3306 Panorama Drive SE., Huntsville, Ala.
Filed May 18, 1961, Ser. No. 111,102
4 Claims. (Cl. 100—42)

This invention relates to the art of converting scrap metal into a transportable form and more particularly to a method of converting automobile bodies or the like into a compact form for transport as scrap.

The relative value of scrap metal is determined to a large extent by the costs involved in transporting such scrap to the point where it can be utilized. Since the automobile industry is one of the largest users of metal, it would necessarily follow that a large supply of scrap metal would come from discarded automobile bodies, truck bodies, and other vehicle bodies. It will be recognized, however, that an automobile body does not present a mass of scrap metal which can be economically transported without changing its form into a more compact configuration. It is economically feasible to transport vehicle bodies to a location where they can be compacted, only a relatively short distance. For example, in the larger metropolitan areas where a heavy concentration of vehicles exists, it is economically feasible to provide one or more permanent installations to which vehicle bodies can be hauled so that they can be compacted into a scrap bale. Indeed, this practice is quite prevalent today and the installations employed to effect the compaction of the vehicel bodies into a transportable mass are extremely large and must, of necessity, have a relatively high capacity in order to be economically feasible.

Aside from the situation that exists relative to the metropolitan areas indicated above, there are vast supplies of scrap in the form of vehicle bodies which are simply allowed to rust away because the costs involved in transporting such bodies either to a location of ultimate use or a permanent installation where they can be compacted into a transportable mass outweigh the value of such bodies as scrap. Consequently, there are many so-called automobile graveyards throughout the country which contain scrap metal which would be valuable if a method could be devised to transport the same relatively long distances at a cost considerably less than the price which the scrap would bring.

The logical solution to the problem is that if it is economically unfeasible to transport the scrap to a compaction station, then the compaction station must be brought to the scrap. While there are presently commercially available portable scrap baling presses, to date none of these portable baling presses has had sufficient capacity to handle scrap in the form of vehicle bodies. Most scrap presses either of the permanent installation type or of the portable type operate on the simple ram principle in which the scrap is dumped into a chamber and the walls of the chamber are moved inwardly to form a compressed mass by a rectilinear motion. Some of these installations do provide a pivoted lid which merely serves to compress the scrap metal placed within the chamber vertically, so that as the walls are advanced the vertical dimension of the scrap mass remains the same.

As indicated above, a scrap press of this type having suitable capacity to handle vehicle bodies simply embodies such a large piece of equipment that it can not be conveniently made portable. Because of this situation, the problem remains unsolved and tons of scrap metal are still rusting away for lack of an economical method of transporting this metal to a remote location of use. Indeed, it sometimes happens that the cost of transporting vehicle bodies from a graveyard exceeds the value that can be obtained from the metal as scrap, so that what is potentially a valuable asset becomes a liability for the lack of a solution to the transportation problem.

An object of the present invention is the provision of a method of converting a vehicle body such as an automobile body or the like into a compact form for transport as scrap, which method can be practiced by portable apparatus.

The present method is based upon the underlying thought that equipment having less built-in strength and less power requirements can be utilized to convert vehicle bodies into a compact form for transport as scrap, if the body is subjected to a folding action rather than a rectilinear ramming action. In other words, less power is required to bend a vehicle body generally along a plane extending transversely through the central portion thereof than is required to compress the body by a rectilinear ramming action. The present method contemplates that since less power and less strength in the equipment are required, it is possible to make the equipment portable so that it can be brought to the scrap. By folding the vehicle body, for example, once in half, the transportable dimension of the body is reduced substantially to one-half its previous size and most likely to approximately one-fourth its previous size. Thus, even with a single fold or bend of the vehicle body, transportation costs are reduced from one-half to one-fourth their cost if not so folded. It is also contemplated within the present invention to apply additional folds so as to compact the bodies even into a smaller mass. In each instance the folding action can be achieved with less power requirements and with less massive equipment, rendering the operation capable of being easily moved from one site of operation to another.

These and other objects of the present invention will become more apparent during the course of the following detailed description and appended claims.

The invention may best be understood with reference to the accompanying drawings wherein an illustrative embodiment is shown.

Figure 2:
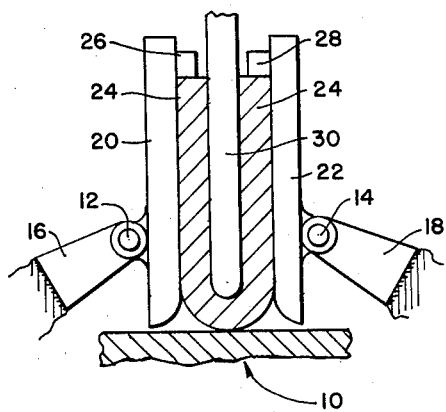

In the drawings:

FIGURE 1 is an elevational view of an apparatus schematically illustrating the initial step in the method of the present invention; and FIGURE 2 is a view similar to FIGURE 1 schematically illustrating a subsequent step in the method of the present invention.

In its broadest aspects, the present method contemplates the conversion of an automobile body into a compact form for transport as scrap by bending the body generally along a plane extending transversely through the central portion thereof. The significant advantage of this method is that the automobile body is most efficiently and effectively converted into compact form by this bending action in that less force is required to effect the conversion. It will be understood that this bending operation can be accomplished in a wide variety of ways with a wide variety of structural devices. The present method embodying the bending action noted above constitutes a departure from the known methods of baling scrap metal which are currently in practice wherein a rectilinear ramming action is performed. The present bending operation is preferably performed initially on the automobile body although it will be understood that some preliminary operations may be performed if desired. For example, the body could be flattened somewhat vertically prior to the bending operation. The bending operation itself may be performed by either the gradual application of sufficient force to effect the action or by the application of impact force. The application of either of these forces must be sufficient to cause the body to bend generally along a plane extending transversely through the central portion thereof and the bending action is completed by moving the portions of the body on each side of the transversely extending plane into adjacency and substantial coextension with each other thus moving the end portions of the body into a position adjacent each other. The entire bending action can be performed by the continuous application of forces or by the initial application of forces of the type indicated above sufficient to effect initial bending of the car body along the plane specified and then the subsequent application of forces capable of completing the bending action. It will also be appreciated that it is within the contemplation of the present invention to apply a second bending action to the car body after the initial bending action has been completed. This second bending action may be applied in the same manner indicated above.

While it will be understood that various structural devices may be utilized in carrying out the principles of the present method as set forth above, in FIGURES 1 and 2 an apparatus is somewhat schematically illustrated which is capable of carrying out the present method in a preferred manner. As shown, the apparatus includes a main frame, generally indicated at 10, which is of a construction capable of being conveniently transported. One of the important features of the present method is that it is capable of converting automobile bodies into a compact form with the application of minimum peak forces. Since the maximum forces involved are relatively low as compared to conventional practices, the structural devices capable of carrying out the invention would require a minimum of weight and size, thereby rendering the same conveniently adaptable to being mounted on a wheeled support. While such wheeled support is not shown in the schematic illustrations of FIGURES 1 and 2 of the drawings, it will be understood that this feature of portability of the apparatus constitutes one of the main advantages of the present method over the practice heretofore utilized.

The frame 10 provides a pair of longitudinally spaced transversely extending pivots 12 and 14. As shown, these pivots are fixed relative to the frame and are provided by suitable lugs 16 and 18. Mounted on the pivots 12 and 14 is a pair of automobile-body-engaging members 20 and 22 respectively. These members are adapted to apply force to the opposite end portions of the vehicle body during the operation of the present method. It will be noted that the pivots 12 and 14 are spaced on opposite sides of a vertical plane passing midway between the members 20 and 22 and the members, initially, are arranged to be disposed in a horizontal position so as to receive an automobile body such as the body 24 illustrated in FIG. 1. The members 20 and 22 have rigid stop blocks 26 and 28 respectively fixed to the outer end portions thereof.

In order to apply the other opposing force to the central portion of the automobile body 24, there is provided a plunger member 30 which is mounted on the frame 10 for vertical reciprocating movement. It will be understood that the members 20, 22 and 30 are of a width greater than the width of the automobile body 24 and suitable structure (not shown) is preferably provided for enclosing the ends of the members to prevent movement of the body material outwardly thereof during the bending operation.

It will be seen that by effecting a downward movement of the plunger member 30 from the solid line position shown in FIGURE 1 to the dotted line position shown therein, the automobile body will be bent generally along a plane extending transversely through the central portion thereof. During this vertical movement of the plunger member 30, the members 20 and 22 will move from the horizontal position shown in FIGURE 1 to the vertical position shown in FIGURE 2. Thus, with the apparatus schematically illustrated in the drawings, the entire bending operation can be completed by the continuous application of gradually applied opposing forces on the automobile body. With the arrangement shown, the forces applied by the members 20 and 22 are simply reactionary forces resulting from the application of a positive downward force by the plunger member 30. As noted above, as the plunger member 30 moves downwardly the reactionary forces applied by the members 20 and 22 will initially be vertically upwardly to the opposite end portions of the automobile body with these vertical reactionary forces changing their direction of application as the members are pivoted in response to the downward movement of the plunger member until they are substantially horizontally applied at the completion of the bending operation.

It will be understood that the present method is not limited to the application of a positive force to the central portion of the automobile body and reactionary forces to the end portions thereof. Either or both of the opposing forces may be positively applied either gradually or by impact. The maximum or peak force involved in the present method would be required to initiate the bending action. It is contemplated that this peak force for most automobile bodies would be within a range of from 20,000 to 30,000 ft. lb.

It should be noted that the size of the vehicle body after a single bending operation is materially reduced. It is immediately apparent that the length of the bent body is one-half of its previous length. It is also apparent that during the bending operation some reduction in the vertical dimension of the body will also occur. In most instances, the thickness of the bent body will be less than the vertical dimension of the unbent body. This means that the volume of the body has been reduced over one-half, and in some instances, to one-fourth its previous size. Subsequent reductions can be obtained by subsequent bendings, although the percentage of reduction in subsequent bendings will not be as great as in the initial bending operation. This reduction in size with one bending operation would enable a carrier to transport two to four times as many automobile bodies as could be transported in their unbent form. This results in a reduction of the transportation costs of one-half to one-fourth that previously required. Moreover, the handling of the individual bodies in loading and unloading the carrier is materially simplified with attendant reduction in costs. Moreover, it will also be understood that the conversion of automobile bodies into the compact form by a single bending action would render them susceptible to subsequent compaction in conventional baling presses. That is, the present method could be employed as a preliminary step to compact the bodies into a form where they could be handled by conventional baling presses which have sufficient size and capacity to handle the bodies once compacted in accordance with the present method, but not sufficient size and capacity to handle uncompacted automobile bodies.

It can thus be seen that there has been provided by the present invention a method which is capable of solving the transportation problem currently existing with respect to automobile body scrap. The present method solves this problem by making it possible to reduce automobile bodies to a compact transportable form with the use of equipment which can be made conveniently transportable due to the minimization of the peak forces involved in compacting the bodies. Thus, with the present method it is economically feasible to bring the compaction station to the scrap so that it can be subsequently transported to the position of use in an economical manner.

The term "automobile body" as herein utilized is not limited to passenger cars but includes as well truck bodies of the same general size and similar vehicles. The term, however, excludes toy vehicles and the like which, of course, would not present the problems previously mentioned.

It thus will be seen that the objects of this invention have been fully and effectively accomplished. It will be realized, however, that the foregoing specific embodiment

We claim:

1. A method of converting an automobile body into a compact form for transport as scrap which comprises the steps of applying generally opposing forces to the central portion of said body and the opposite end portions thereof of an amount sufficient to cause said body to bend and compact generally along a plane extending transversely through the central portion thereof and subsequently applying to the bent body forces sufficient to move and compact the portions of the body on each side of said transversely extending plane into adjacency and substantial coextension with each other.

2. A method as defined in claim 1 wherein the forces sufficient to move the portions of the body on each side of said transversely extending plane into adjacency and substantial coextension with each other constitute a continuous application of the forces sufficient to cause said body to bend.

3. A method as defined in Claim 1 wherein the force applied to the central portion of said body is a positively applied force and the forces applied to opposite end portions of said body are reactionary forces.

4. A method as defined in claim 3 wherein the force applied to the central portion of said body is applied vertically downwardly thereto.

References Cited in the file of this patent
UNITED STATES PATENTS

| | | |
|---|---|---|
| 2,473,533 | Lebedeff | June 21, 1949 |
| 2,882,952 | Johnson | Apr. 21, 1959 |
| 2,958,273 | Morrow | Nov. 1, 1960 |